Dec. 19, 1950     E. A. GEE ET AL     2,534,259
RECOVERY OF ALCOHOL FROM A TERNARY SOLUTION

Filed Dec. 14, 1945     2 Sheets-Sheet 1

EDWIN A. GEE and
JOHN VANDEN BOSSCHE
INVENTOR

BY *J. P. Morehead*
ATTORNEY

Edwin A. Gee and John Vanden Bossche
INVENTORS

Patented Dec. 19, 1950

2,534,259

UNITED STATES PATENT OFFICE 2,534,259

RECOVERY OF ALCOHOL FROM A TERNARY SOLUTION

Edwin A. Gee, Washington, D. C., and John Vanden Bossche, Hyattsville, Md., assignors to the United States of America as represented by the Secretary of the Interior Application December 14, 1945, Serial No. 635,116
11 Claims. (Cl. 260—643)

(Granted under the act of March 3, 1883, as amended April 30, 1928; 370 O. G. 757)

The invention described herein may be manufactured and used by or for the Government of the United States for governmental purposes without the payment to us of any royalty thereon in accordance with the provisions of the act of April 30, 1928 (ch. 460, 45 Stat. L. 467).

This invention relates to the recovery of water soluble alcohols from admixture with aqueous solutions of inorganic salts, and more particularly relates to the recovery of ethanol from concentrated aqueous alum solutions. Still more particularly this invention relates to the recovery of ethanol from wet filter cakes of aluminum sulfate which have been produced by precipitation with ethanol from aqueous mother liquors.

In copending application Serial Number 617,888, filed September 21, 1945, in the names of Edwin A. Gee et al., there has been disclosed a way to produce practically iron-free aluminum sulfate by precipitation with ethanol. This procedure produces a wet cake of aluminum sulfate crystals which contain large proportions of water of hydration, and a very considerable amount of alcohol. The alcohol can be removed and recovered by vacuum distillation, but such a procedure is extremely tedious and so expensive as to render it prohibitive in commercial operation. It has now been found that alcohols such as ethanol can be recovered from wet salts such as aluminum sulfate in a simple and expeditious fashion as more fully to be explained hereinafter.

Accordingly, this invention has for an object the recovery of water soluble alcohols from aqueous solutions of inorganic salts. Another object of this invention is the recovery of ethanol from wet filter cakes of alums containing substantial amounts of ethanol. Other objects and advantages will be apparent or will appear hereinafter as the ensuing description proceeds.

These objects are accomplished in accordance with this invention wherein a water soluble alcohol such as ethanol is recovered from admixture with water and alums such as aluminum sulfate, by adjusting the composition of such a mixture to proportions permitting formation of two liquid phases, then bringing the mixture to a temperature at which formation of two liquid phases takes place, and separating the alcohol-rich phase from the alcohol-poor phase. It has been discovered that within certain ranges of compositions, the liquid systems aluminum sulfate-ethyl alcohol-water will separate and stratify into two liquid phases containing different proportions of alcohol in each of the liquid phases. It has also been discovered that the proportion of alcohol in each liquid phase is very largely influenced by the temperature at which the solution or solutions is or are maintained; that is, at elevated temperatures approaching the boiling point of the particular alcohol employed, the two liquid phases have a very markedly different content of alcohol—for example at 80 degrees, the upper layer corresponding to the less dense phase, contains of the order of ten times as much alcohol as the lower layer. This observation thus permits the separation and recovery of ethanol and other alcohols from concentrated solutions of aluminum sulfate, in a simple and expeditious manner by heating the solution to a temperature approaching the boiling point, stratifying the mixture into two phases, and separating the alcohol-rich phase from the alcohol-lean phase.

In order to secure the necessary two liquid phases, it has been observed that the composition or proportions of alcohol to water to alum or other inorganic salt must be adjusted within certain limits. At relatively low temperatures of the order of 30 degrees C., only a very narrow range of compositions will yield the necessary 2-phase system. However, it has been observed and will be more fully explained hereinafter, that at elevated temperatures below the boiling point of the alcohol, preferably at temperatures of about 80 degrees C., a relatively broad range of compositions will yield a 2-phase system, that is will stratify into two separate and distinct liquid layers. Thus, the composition necessary to yield two liquid phases is dependent upon the temperature at which the liquid system is maintained.

Fortunately, in the recovery of alcohol such as ethanol from wet filter cakes containing also alum and water, simple heating of the filter cake results in a melting or dissolution of the alum in its water of hydration whereby there is formed a concentrated aqueous solution of aluminum sulfate or other alum in its water of hydration and of course, in the alcohol to be recovered. To produce a composition within the necessary limits yielding a 2-phase liquid system at temperatures between 30 degrees C. and the boiling point of the alcohol from such wet filter cakes, it is only necessary to add a sufficient quantity of water to the hot solution to bring the composition within the desired range. Preferably, for reasons of economy in alum recovery and in order to yield a concentrated alcohol, it is desirable to incorporate with the alum "melt" only a minimum of water. The exact quantity of water necessary to yield a 2-phase system for any particular aluminum sulfate-alcohol-water mixture can readily be determined from an inspection of the accompanying drawings and ensuing tabulated phase data.

Figure 1:
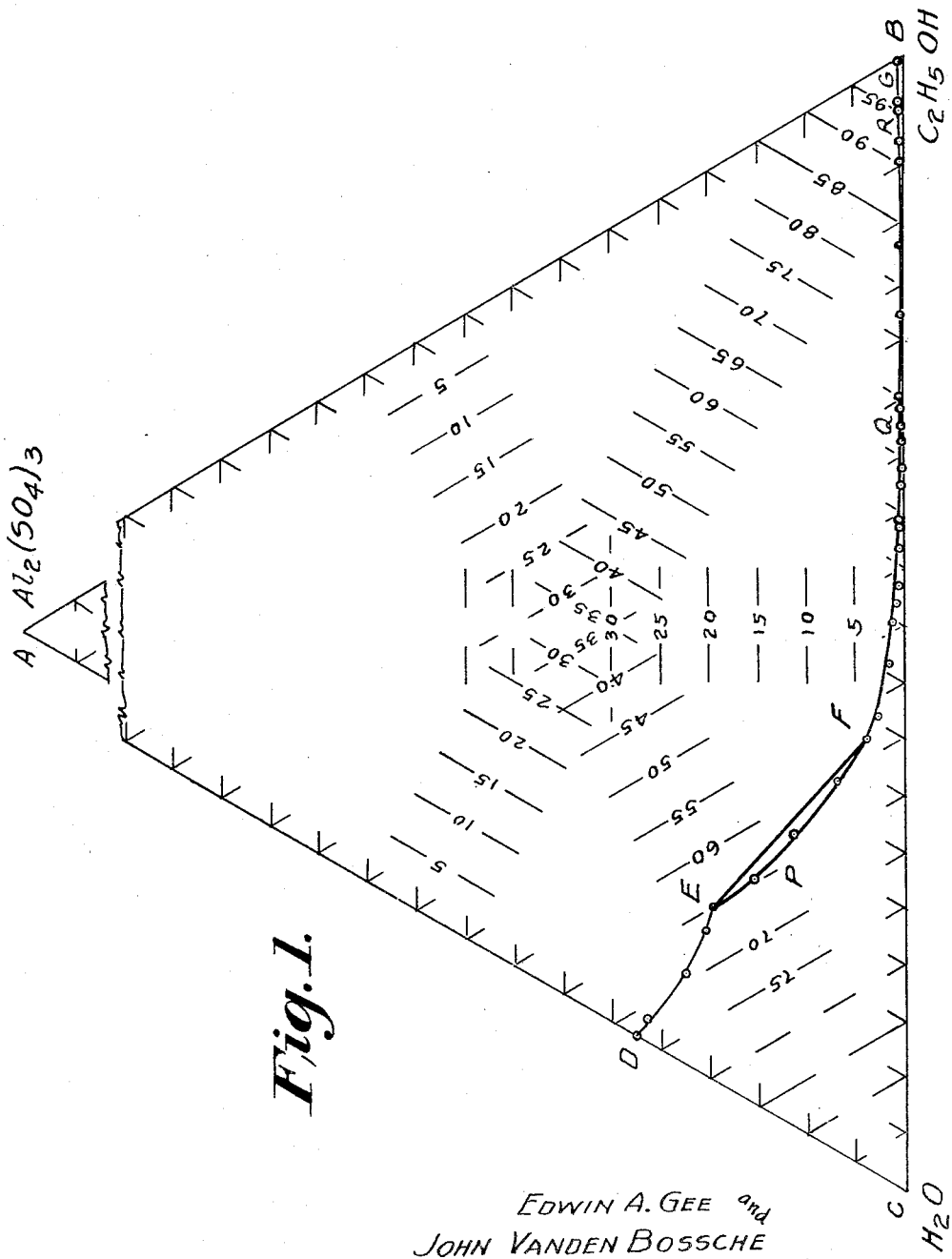
Fig. 1 is a phase diagram of the system aluminum sulfate-ethanol-water at 30 degrees C.

In Fig. 1, the solubility of aluminum sulfate hexadecahydrate in alcohol-water solvents is represented by the curves DE and FQ, which are separated by the 2-liquid curve EPF. The points E and F are the isothermally invariant conjugate solutions in equilibrium with the solid. The curve QR represents solutions in equilibrium with the decahydrate and RG represents solutions saturated with the anhydrous salt. Q and R are the isothermally invariant solutions saturated in each case with two solids, the hexadecahydrate and the decahydrate for the former point, and the decahydrate and anhydrous salt for the latter point.

Figure 2:
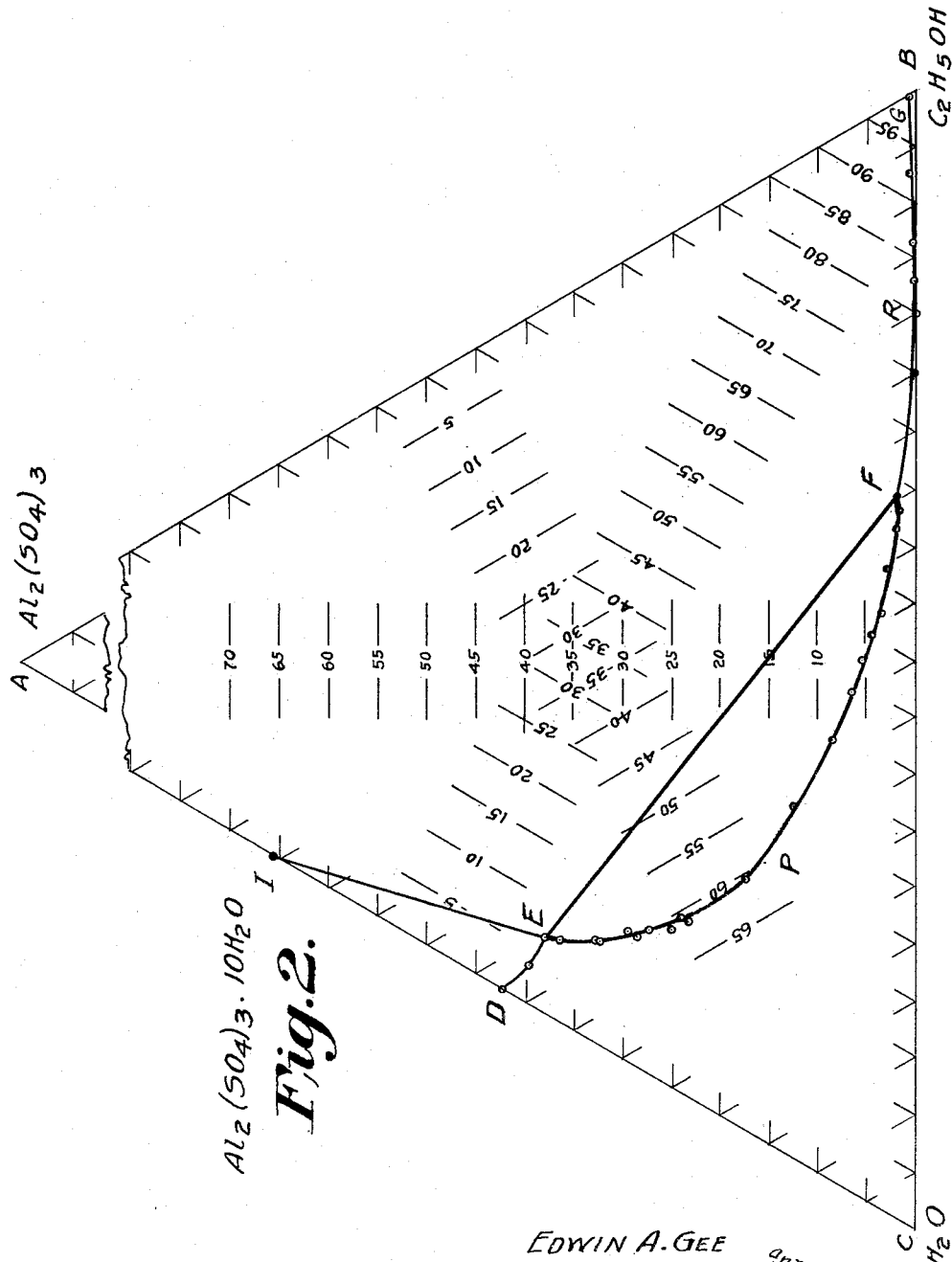
Fig. 2 is a phase diagram of the system aluminum sulfate-ethanol-water at 80 degrees C.

In Fig. 2, the solubility of aluminum sulfate decahydrate in aqueous alcohol solvents is represented by the curves DE and FR, which are separated by the 2-liquid curve EPF corresponding to Fig. 1. The curve RG represents solutions in equilibrium with the anhydrous salt, and the point R is the isothermally invariant solution saturated both with decahydrate and anhydrous salt.

The following Tables I and II show in tabulated form the equilibrium data for the system aluminum sulfate-ethyl alcohol-water at 30 degrees C. and at 80 degrees C. In the table, the headings "Total Composition" and "Composition of Solution" refer respectively to the compositions of the initial over- or under-saturated mixture and to the final solution in equilibrium with solid phase. The heading "A. S." refers to anhydrous salt which in the case of Tables I and II, is anhydrous aluminum sulfate. The tables were constructed by ordinary physical chemistry methods:

*Table I*

[Equilibrium data for 30° isotherm, 30°]

| Total composition, percent | | Composition of Solution | | | Solid Phase |
|---|---|---|---|---|---|
| A. S. | EtOH | Percent A. S. | Percent EtOH | Density | |
| 2.8 | (G) 97.1 | 0.1 | 99.8 | 0.781 | $Al_2(SO_4)_3$. |
| 3.3 | 93.0 | .1 | 96.0 | 0.790 | Do. |
| 3.1 | (R) 91.8 | .1 | 95.1 | .791 | $Al_2(SO_4)_3$ and $Al_2(SO_4)_3.10H_2O$. |
| 1.0 | 91.2 | .0 | 92.6 | .800 | $Al_2(SO_4)_3.10H_2O$. |
| 1.8 | 88.6 | .0 | 90.8 | .804 | Do. |
| 2.7 | 80.5 | .0 | 83.5 | .824 | Do. |
| 1.0 | 76.0 | .0 | 77.5 | .841 | Do. |
| 3.5 | 66.8 | .0 | 70.1 | .861 | Do. |
| 2.4 | 66.6 | .0 | 69.1 | .863 | Do. |
| 1.6 | 66.0 | .0 | 67.8 | .867 | Do. |
| 5.2 | (Q) 60.8 | .0 | 66.4 | .870 | $Al_2(SO_4)_3.10H_2O$ and $Al_2(SO_4)_3.16H_2O$. |
| 2.0 | 62.0 | .0 | 64.0 | .878 | $Al_2(SO_4)_3.16H_2O$. |
| 1.7 | 60.4 | .1 | 62.4 | .881 | Do. |
| 3.2 | 56.5 | .2 | 59.4 | .882 | Do. |
| 4.1 | 54.5 | .2 | 58.8 | .892 | Do. |
| 4.8 | 52.3 | .3 | 56.8 | .898 | Do. |
| 3.3 | 50.8 | .4 | 53.5 | .908 | Do. |
| 2.9 | 49.1 | .7 | 51.8 | .913 | Do. |
| 5.2 | 45.3 | 1.0 | 49.9 | .919 | Do. |
| 6.0 | 41.8 | 1.4 | 46.0 | .924 | Do. |
| 6.1 | 38.2 | 2.8 | 40.9 | .935 | Do. |

| | | Double layer [1] | | | | | |
|---|---|---|---|---|---|---|---|
| | | Top | | | Bottom | | |
| | | Percent A. S. | Percent EtOH | Density | Percent A. S. | Percent EtOH | Density |
| 13.2 | (E & F) 24.7 | 3.8 | 38.1 | (F) 0.947 | 19.5 | 15.5 | (E) 1.162 |
| 10.2 | 27.7 | 6.9 | 33.0 | 0.957 | 15.3 | 20.0 | 0.990 |

| | | | | | Solid phase | | |
|---|---|---|---|---|---|---|---|
| 11.4 | 26.1 | 11.4 | 26.1 | 1.038 | $Al_2(SO_4)_3.16H_2O$. | | |
| 24.2 | 11.4 | 20.3 | 13.0 | 1.186 | Do. | | |
| 24.2 | 7.3 | 22.5 | 8.1 | 1.223 | Do. | | |
| 27.2 | 2.0 | 26.6 | 2.0 | 1.293 | Do. | | |
| 28.7 | (D) 0.0 | 27.7 | 0.0 | 1.302 | Do. | | |

[1] Aluminum sulfate hexadecahydrate is the solid phase throughout.

Table II

[Equilibrium data for 80° isotherm, 80°]

| Total composition, Per Cent | | Composition of Solution | | | Solid Phase |
|---|---|---|---|---|---|
| A. S. | EtOH | Per Cent A. S. | Per Cent EtOH | Density | |
| 3.0 | (G) 96.8 | 0.9 | 98.9 | 0.745 | Al₂(SO₄)₃. |
| 2.0 | 90.9 | .7 | 92.0 | .759 | Do. |
| 2.4 | 84.3 | .3 | 86.3 | .776 | Do. |
| 2.5 | 81.0 | .1 | 83.0 | .783 | Do. |
| 3.1 | (Q) 77.5 | .0 | 80.0 | .790 | Al₂(SO₄)₃ and Al₂(SO₄)₃.10H₂O. |
| 2.1 | 73.3 | .1 | 74.9 | .812 | |

| | | Double layer¹ | | | | | |
|---|---|---|---|---|---|---|---|
| | | Top | | | Bottom | | |
| | | Per Cent A. S. | Per Cent EtOH | Density | Per Cent A. S. | Per Cent EtOH | Density |
| 30.1 | (E & F) 19.1 | 2.0 | 63.5 | (F) 0.840 | 38.0 | 6.9 | (E) 1.345 |
| 22.8 | 29.2 | 1.9 | 62.1 | .848 | 36.4 | 7.2 | 1.320 |
| 15.3 | 38.9 | 2.0 | 60.8 | .854 | 32.8 | 9.1 | 1.285 |
| 27.7 | 17.7 | 2.0 | 60.5 | .856 | 32.9 | 9.0 | 1.280 |
| 21.1 | 26.9 | 3.0 | 56.5 | .860 | 32.2 | 9.3 | 1.230 |
| 14.0 | 36.4 | 3.4 | 52.4 | .871 | 29.4 | 11.5 | 1.210 |
| 25.7 | 16.4 | 4.5 | 50.0 | .903 | 28.5 | 11.5 | 1.200 |
| 19.5 | 25.0 | 5.5 | 47.3 | .912 | 27.2 | 12.8 | 1.152 |
| 13.0 | 33.7 | 6.6 | 44.0 | .918 | 25.0 | 14.0 | 1.143 |
| 18.2 | 23.2 | 8.4 | 38.8 | .964 | 23.2 | 15.5 | 1.132 |

| | | | | | Solid Phase | | |
|---|---|---|---|---|---|---|---|
| 24.0 | 15.3 | 24.0 | 15.3 | 1.131 | Al₂(SO₄)₃.10H₂O. | | |
| 17.5 | 22.0 | 17.5 | 22.0 | 1.042 | Do. | | |
| 12.3 | 31.0 | 12.3 | 31.0 | 0.990 | Do. | | |
| 40.5 | 3.5 | 39.4 | 3.5 | --- | Do. | | |
| 43.5 | (D) 0.0 | 42.2 | 0.0 | --- | Do. | | |

¹ Aluminum sulfate decahydrate is the solid phase throughout.

An examination of the phase diagram in Fig. 1 and the tabulated data in Table I shows that the area enclosed by the closed traverse on Fig. 1 passing through the points EPFE is the locus of all compositions having the property of separating into two liquid phases at this particular temperature. In Fig. 2 and referring to the tabulated data of Table II, it will be seen that the area of the phase diagram bounded by the closed traverse EPFE in Fig. 2 is also the locus of all compositions which will yield a 2-phase system. However, at 80 degrees C., the area enclosed by the points EPFE is very much larger than it is at 30 degrees C. This relation appears to obtain at increasingly elevated temperatures up to the point at which substantial amounts of alcohol are lost by boiling out of the solution. Therefore, it is preferred to employ an elevated temperature which is, however, below the boiling point of the solution. Reference to the data under the heading "Double Layer" in both Tables I and II clearly shows the striking difference in alcohol contents between the upper and lower layers at elevated temperatures even though there is a substantial difference in the alcohol content at temperatures as low as 30 degrees C.

In the practical application of this invention, ordinary aluminum sulfate wet filter cake produced by crystallization from aqueous alcohol solutions or by any other means yielding an alcohol-containing wet filter cake, is heated to an elevated temperature below the boiling point of ethyl alcohol or other lower water soluble alcohol, and thereupon the filter cake melts, dissolves in its own water of crystallization as well as in retained mother liquor, and ordinarily yields a 3-phase system. The melting operation can be carried out in any suitable vessel, provided with heating and cooling means and with means for decanting or otherwise separating an upper stratified liquid layer from a lower liquid layer. Thereupon, sufficient water, preferably heated also to approximately 80 degrees C., is slowly added with agitation until a trial stratification test discloses the formation of two separate liquid phases. The lower liquid phase is then drawn off, as by a suitable petcock in the vessel, and is thereby separated from the upper or alcohol-rich liquid phase. If desired, the lower liquid phase can be collected to yield, on cooling, a purified alum cake containing only very small amounts of ethyl alcohol or other alcohol, or optionally, the lower liquid phase can be subjected to ordinary distillation to recover the last traces of its contained alcohol. The upper liquid layer, which is very rich in alcohol, can be suitably enriched with concentrated alcohol and directly used for the further precipitation and purification of alum. Optionally, a proportion of the upper layer can be withdrawn, subjected to ordinary distillation and rectification to recover concentrated alcohol therefrom, and the balance of the upper layer can then be enriched directly with this recovered alcohol for reuse in purification of further quantities of alum. Another optional procedure is to subject the whole of the upper or alcohol-rich layer to ordinary distillation and rectification whereby substantially the whole of the alcohol is recovered therefrom by very simple and inexpensive means.

From the foregoing it will be seen that a simple and inexpensive way has been provided to recover ethanol or other suitable lower aliphatic water soluble alcohol from concentrated solutions of mineral salts such as the alums and particularly aluminum sulfate.

Example of decantation drying 100 pounds of washed alum cake wet with alcoholic wash liquor is discharged from a suitable filter into a jacketed tank equipped with heating coils and decantation apparatus. The cake had the following composition:

| | |
|---|---|
| Wash liquor retention | 50% by wt. liquor |
| Wash liquor strength | 68% C$_2$H$_5$OH |
| Alum hydrate | 16% H$_2$O |
| Alum (dry), 27 lbs | 27% |
| Alcohol, 34 lbs | 34% |
| Water, 39 lbs | 39% |

Twenty pounds of water was added to yield the following composition:

| | Per cent |
|---|---|
| Alum, 27 lbs | 22.5 |
| Alcohol, 34 lbs | 28.3 |
| Water, 59 lbs | 49.2 |

*Composition of two phase system at 80° C.*

| | Per cent |
|---|---|
| Top layer (total), 48 lbs | 40.0 |
| Alum, 0.9 lb | 1.9 |
| Alcohol, 29.7 lbs | 61.9 |
| Water, 17.4 lbs | 36.2 |
| Bottom layer (total), 72 lbs | 60.0 |
| Alum, 26.5 lbs | 36.8 |
| Alcohol, 4.9 lbs | 6.9 |
| Water, 40.6 lbs | 56.3 |

The top layer is then decanted and may be recycled while the residual alcohol in the bottom layer is removed by steam sparging or distillation. The desired concentration of the alum is then obtained by continuation of the above.

While the invention has been described with particular reference to the recovery of ethanol from aluminum sulfate, for example filter cakes containing also mother liquors and ethanol, it is also applicable to the treatment of such alums as potash alum, chrome alum, and similar inorganic salts. Likewise, other suitable alcohols can be used such as for example methanol, normal and isopropanol, and similar lower water soluble alcohols.

Various changes can be made in the invention as disclosed without departing from the spirit and scope thereof, since many apparently differing embodiments of this invention will occur to one skilled in the art.

What is claimed is:

1. In a process for the recovery of a water-soluble alcohol from admixture with aluminum sulfate and water, the steps which comprise adjusting the composition of such a mixture to proportions permitting formation of a two-phase liquid-liquid system, then bringing the mixture to a temperature at which formation of said two-phase system takes place, and separating the alcohol-rich phase from the alcohol-poor phase.

2. In a process for the recovery of ethanol from admixture with aqueous aluminum sulfate solution, the steps which comprise adjusting the composition of such a mixture to lie within the area bounded by EPFE on the accompanying phase diagram (Figure 1), heating the mixture to cause separation into two liquid phases, and removing and recovering the alcohol-rich phase from the alcohol-poor phase.

3. A process for the removal of ethanol from an aqueous solution formed by melting alcohol-crystallized, hydrated aluminum sulfate, which comprises incorporating sufficient water into such a solution to permit formation of a two-phase liquid-liquid system upon heating, and then heating the solution to a temperature not higher than the boiling point of alcohol whereby said two liquid phases are formed, and separating the alcohol-rich phase from the alcohol-poor phase.

4. A process for the recovery of ethyl alcohol from an aqueous alcoholic solution of aluminum sulfate, which comprises adjusting the water content of the mixture to permit formation of a two-phase liquid-liquid system upon heating, and heating the mixture to a temperature of about 80 degrees centigrade whereby stratification into alcohol-rich and alcohol-poor layers results, and separating and recovering the alcohol-rich layer.

5. In a process for the recovery of a water-soluble alcohol from admixture with aluminum sulfate and water, the steps which comprise adjusting the total composition of such a mixture to lie within the area bounded by the locus of the conjugate solutions of the triaxial system on a three phase diagram for a predetermined temperature not greater than the boiling point of the alcohol, heating said adjusted mixture to said predetermined temperature whereby the conjugate solutions stratify in an alcohol-rich phase floating on an alcohol-poor phase, and thereafter separating the stratified phases.

6. In a process for the recovery of ethanol from admixture with aluminum sulfate and water, the steps which comprise adjusting the total composition of such a mixture to lie within the area bounded by the locus of the conjugate solutions of the triaxial system on a three phase diagram for a predetermined temperature not greater than the boiling point of ethanol, heating said adjusted mixture to said predetermined temperature whereby the conjugate solutions are formed and stratify as an alcohol-rich phase floating on an alcohol-poor phase, and thereafter separating the stratified phases.

7. In a process for the recovery of ethanol from admixture with aluminum sulfate and water, the steps which comprise adjusting the total composition of such a mixture to lie within the area bounded by the locus of the conjugate solutions of the triaxial system on a three phase diagram for a predetermined temperature between about 30 and 80 degrees centigrade, heating said adjusted mixture to said predetermined temperature, whereby the conjugate solutions of said adjusted total composition are formed and stratify, as an alcohol-rich phase floating on an alcohol-poor phase, and thereafter separating the alcohol-rich phase and the alcohol-poor phase.

8. A process for the recovery of ethyl alcohol from admixture of ethyl alcohol, water, and aluminum sulfate which comprises adjusting the concentration of at least one of the admixture components so that the total composition of the admixture will be capable of resolving into the conjugate solutions of said adjusted total composition at a predetermined temperature not greater than the boiling point of said alcohol, heating said adjusted composition to said predetermined temperature to effect the formation of the conjugate solution, one of said conjugate solutions being an alcohol-rich phase and the other conjugate solution being an alcohol-poor phase, and then suitably separating the alcohol-rich phase from the alcohol-poor phase.

9. In a process for the production of aluminum sulfate, involving the precipitation of alum from an aqueous solution by the addition thereto of ethyl alcohol and separating the crystallized aluminum sulfate from the mother liquor, the improved method for the recovery of the ethyl alcohol values entrapped in the wet crystalline alum, which comprises adjusting the total composition of the aluminum sulfate-water-ethyl alcohol mixture so it will contain about 1.5 to 38 percent aluminum sulfate, 6 to 63 percent ethyl alcohol, and 34 to 61 percent water, heating said adjusted composition to about 80 degrees centigrade, and separating the resulting stratified liquid phases whereby an enriched alcohol solution suitable for recycling is recovered as the lighter liquid phase.

10. In a process for the production of aluminum sulfate, involving the precipitation of aluminum sulfate from an aqueous solution by the addition thereto of ethyl alcohol and separating the crystallized aluminum sulfate from the mother liquor, the improved method for the recovery of the ethyl alcohol values entrapped in the wet crystalline alum, which comprises adjusting the total composition of the aluminum sulfate-water-ethyl alcohol mixture so it will contain about 22.5 percent aluminum sulfate, 28.3 percent ethyl alcohol, and 49.2 percent water, heating said adjusted composition to about 80 degrees centigrade, and separating the resulting stratified liquid phases whereby an enriched alcohol solution suitable for recycling is recovered as the lighter liquid phase.

11. In a process for the recovery of ethanol from admixture of aqueous aluminum sulfate solution, the steps which comprise adjusting the composition of such a mixture to lie within the area bounded by EPFE on the accompanying diagram (Figure 2), heating the mixture to cause separation into two liquid phases, and removing and recovering the alcohol-rich phase from the alcohol-poor phase.

EDWIN A. GEE.
JOHN VANDEN BOSSCHE.

REFERENCES CITED

The following references are of record in the file of this patent:

UNITED STATES PATENTS

| Number | Name | Date |
|---|---|---|
| 1,985,205 | Derr | Dec. 18, 1934 |
| 2,013,804 | Klein | Sept. 10, 1935 |
| 2,123,554 | Klosky | July 12, 1938 |
| 2,137,605 | Derr | Nov. 22, 1938 |
| 2,398,338 | Walker | Apr. 9, 1946 |
| 2,421,375 | Elliott | June 3, 1947 |

OTHER REFERENCES

Tarasenkov et al.: Chem. Abs., vol. 32, 1555-6 (1938).

Schreinemakers: Zeit. Physik Chem., vol. 79, 554-64.

Frankforter: 8th Inter. Congress of Applied Chem., vol. 22, 87-95 (1912).

Taylor: Treatise on Physical Chemistry, vol. 1, pub. by D. Van Nostrand Co. (1925), N. Y., pages 449-50.